United States Patent [19]

DiMatteo et al.

[11] Patent Number: 4,494,874
[45] Date of Patent: Jan. 22, 1985

[54] DETECTION OF THREE-DIMENSIONAL INFORMATION USING A PROJECTED POINT OR LINE OF LIGHT

[75] Inventors: Paul DiMatteo, Huntington; Joseph Ross, Fort Salonga, both of N.Y.

[73] Assignee: Robotic Vision Systems, Inc., Hauppauge, N.Y.

[21] Appl. No.: 281,068

[22] Filed: Jul. 7, 1981

[51] Int. Cl.³ .............................................. G01B 11/24
[52] U.S. Cl. ....................................... 356/376; 356/1; 250/205
[58] Field of Search ................. 356/376, 1, 4; 250/205

[56] References Cited

U.S. PATENT DOCUMENTS

| | | | |
|---|---|---|---|
| 3,909,602 | 9/1975 | Micka | 356/394 |
| 4,125,317 | 11/1978 | Gordon et al. | 356/376 |
| 4,146,926 | 3/1979 | Clerget et al. | 356/376 |
| 4,299,491 | 11/1981 | Waters et al. | 356/376 |

OTHER PUBLICATIONS

Ishii, et al., "Feature Extraction of 3-Dimensional Objects with a Laser Tracker", *Transactions of the Installment and Control Engineers*, (Japanese), vol. 10, No. 5, (Oct. 1974), pp. 599–605.

Primary Examiner—R. A. Rosenberger
Attorney, Agent, or Firm—Max Fogiel

[57] ABSTRACT

An object is scanned first with a flying light spot from a variable-intensity light-spot projector, and the reflected light is used as signals to point by point modify the output of the projector in accordance with the intensity of the respective reflective-light signal. Thereupon the object is scanned a second time and the projector instructed to apply less light than before to those points of the object from which a strong reflected-light signal was received during the first scan, and to apply more light to points from which a weak reflected-light signal was received during the first scan.

6 Claims, 3 Drawing Figures

DETECTION OF THREE-DIMENSIONAL INFORMATION USING A PROJECTED POINT OR LINE OF LIGHT

BACKGROUND OF THE INVENTION

The present invention relates to the detection of three-dimensional information using a projected point or line of light.

More particularly, the invention relates to overcoming the problem that in such detection the signal received by a camera or photo detector provided for this purpose, often suffers from too little or too much light being present at various locations of the item or image being illuminated.

Systems employing the aforementioned type of detection are used, for example, where it is important to determine by position of points and objects (e.g. robot arms, to name only one example) in three-dimensional space. In such systems a moving point (dot) of light—or else a moving line of light—will be projected upon the object (item) to be illuminated, and the illumination of each area on the object which is touched by the light, will be sensed (and converted into a signal) by a camera or photo detector provided for this purpose. A serious problem with this is that the received signal often suffers from the fact that at one or some locations of the scanned object there may be too much light, whereas at others there may be too little light, so that the final reading is incorrect.

SUMMARY OF THE INVENTION

It is an object of the present invention to overcome the prior-art disadvantages.

More particularly, it is an object of the present invention to eliminate or greatly reduce the prior-art problem of inaccurate light signals.

Another object is to overcome the problems of the prior art without having to drastically increase technological or economic investments.

In keeping with these objects, and with still others which will become apparent as the description proceeds, one aspect of the invention resides in a method of detecting three-dimensional information, comprising the steps of projecting a variable-intensity flying spot of light onto an object to be scanned; effecting a first scan by causing relative movement between object and light spot; receiving light-intensity signals back from the object point by scanned point and modifying the intensity of the light spot in accordance with each received signal; effecting a second scan by causing relative movement between object and light spot; and reducing the light-spot intensity during the second scan at such points of the object where the signal was strong during the first scan, and increasing the light-spot intensity during the second scan at such points where the signal was weak during the first scan.

The invention will hereafter be described with reference to an exemplary embodiment, as illustrated in the drawing. However, it is to be understood that this embodiment is illustrated and described for the purpose of information only, and that nothing therein is to be considered limiting of any aspects of the invention.

DESCRIPTION OF PREFERRED EMBODIMENTS

Figure 1:
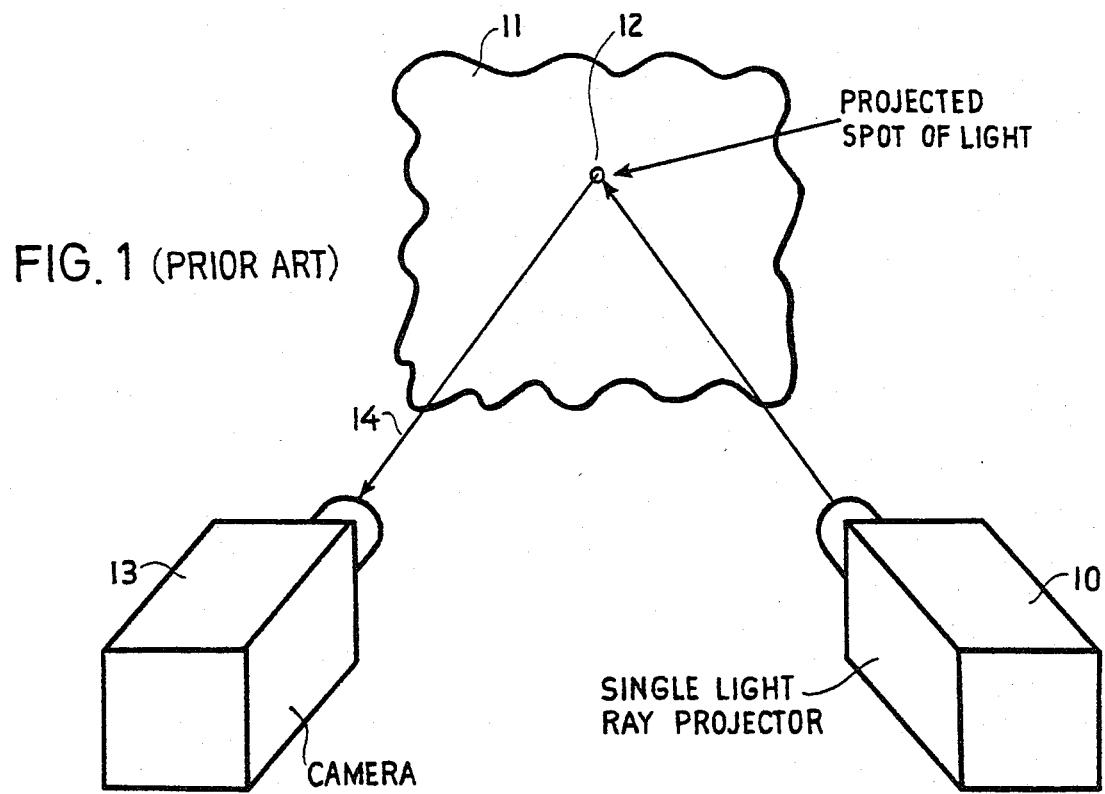
FIG. 1 is a diagrammatic illustration, showing one prior-art system.

One prior-art system of the type mentioned in the introduction hereto, is shown in FIG. 1 wherein reference numeral 10 identifies a projector of the type which projects a single light ray, thus producing on an object 11 to be examined a projected spot of light 12. A camera 13 is so positioned that it receives reflected light 14 from the spot 12. The camera records this reflected light. The object 11 moves so that the spot 12 travels over the object 11. At some locations the object 11 will receive (or reflect to the camera 13) more light that at others, with the result that the record made in the camera will be inaccurate.

Figure 2:
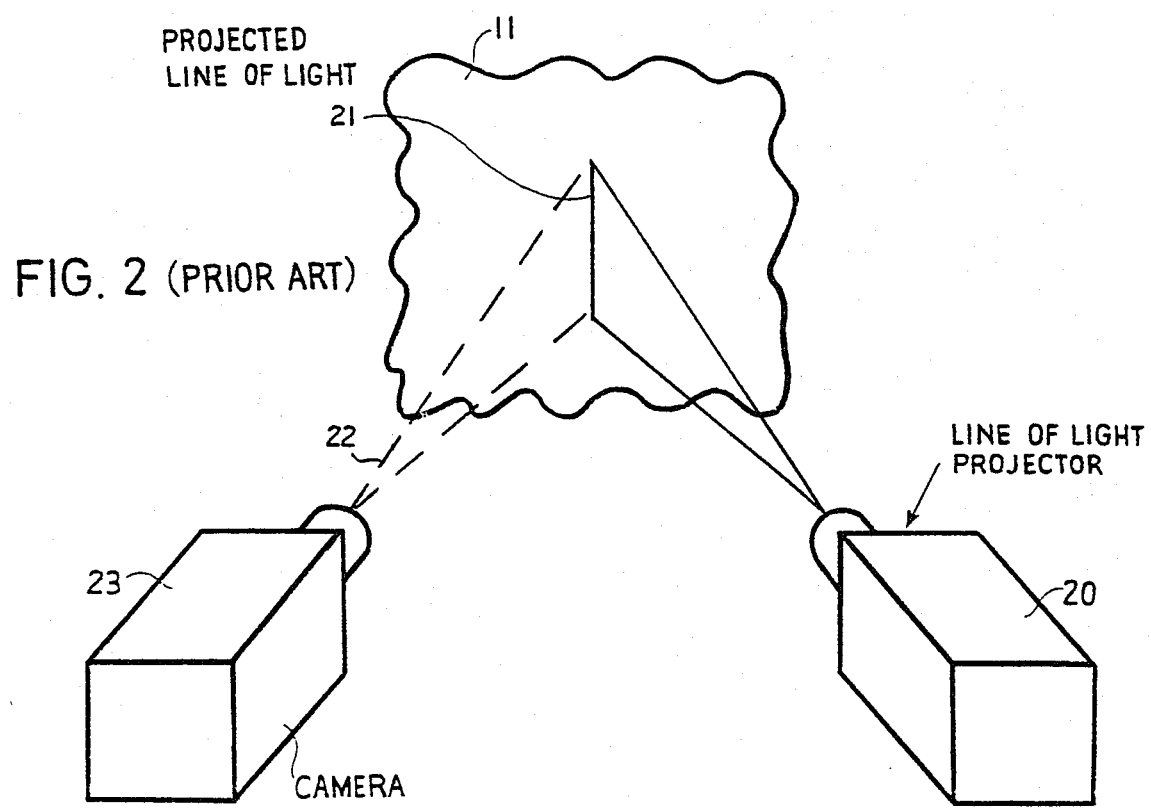
FIG. 2 is a view similar to FIG. 1, but showing another prior-art system.

The other prior art systemis shown in FIG. 2, where the object to be scanned is again identified with reference numeral 11. The only difference in this version from the preceding embodiment, is that FIG. 2 uses an (also known) projector 20 of the type which projects a line 21 of light, instead of a point. The reflection 22 of this line of light 21 (which is, of course, again made to travel over the object 11) is received in a camera 23. The disadvantages are the same as in FIG. 1.

Figure 3:
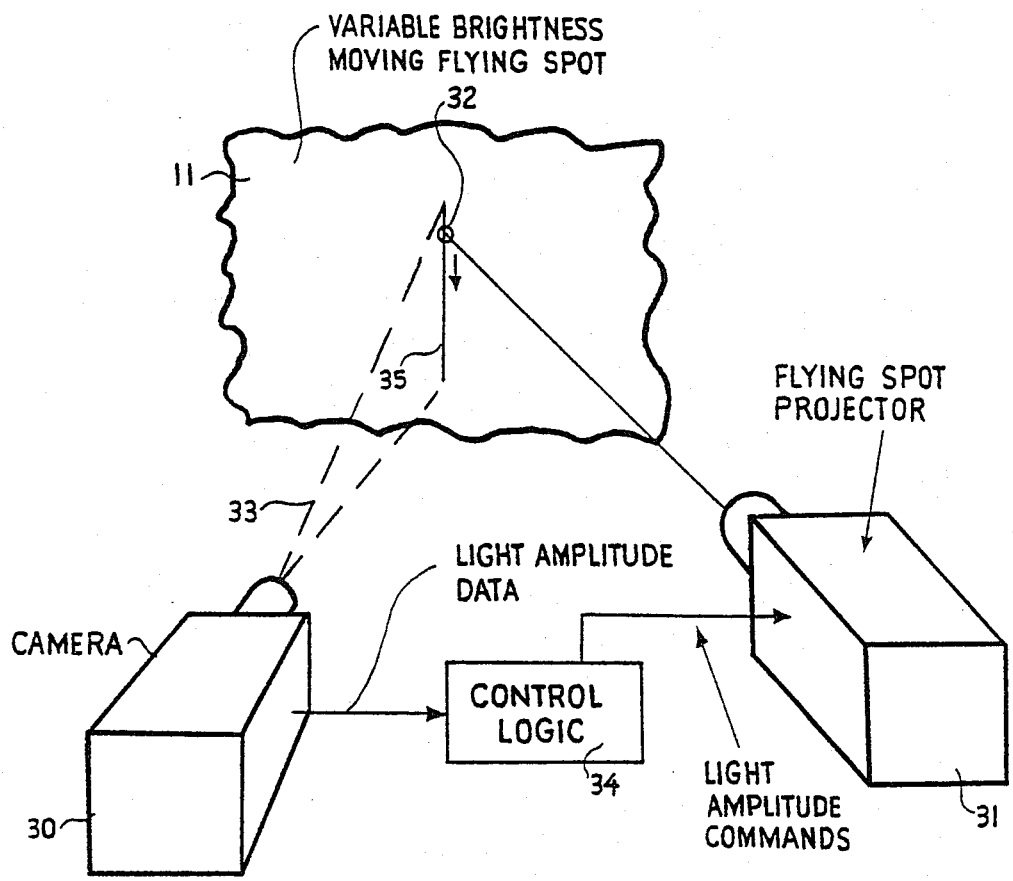
FIG. 3 is another diagrammatic view, but illustrative of an exemplary embodiment of the invention.

To overcome these disadvantages, the invention proposes a solution which is illustrated by way of an exemplary embodiment in FIG. 3. It is noted, incidentally, that both the inventive method and the inventive arrangement will be conjointly discussed with reference to FIG. 3.

In this Figure the object to be scanned is again identified with reference numeral 11, and the camera bears reference numeral 30. Unlike the prior art, however, the projector 31 which is used is of the type producing a so-called "flying spot" 32 and, in addition, the output of the projector 31 has variable brightness. Projectors having both of these features are known per se.

In operation, a double rather than a single measurement (i.e. scan) is performed. In the first measurement the brightness signal 33 received back from the camera 30 from the light spot 32 is measured point-by-point (i.e. spot-by-spot 32) and used to modify the output of the projector 31 point-by-point.

During the subsequent second measurement (scan) the control logic 34 (known per se) instructs the projector 37 to transmit more light than during the first scan to those places of object 11 where, during the first scan, the light signal received in camera 30 was low (weak). Conversely, those places of object 11 from which during the first scan the light signals reflected into the camera were strong, receive less light from the projector 31 during the second scan.

The "flying spot" 32 of light may either be stationary with respect to the projector, as in FIG. 1, or it may traverse a linear (planar) path in the preferred embodiment, as shown by reference numeral 35 in FIG. 3. However, the path need not be linear, since other paths are also possible.

The invention has been described and illustrated with reference to an exemplary embodiment. It is not to be considered limited thereto, inasmuch as all modifications and variations which might offer themselves are intended to be encompassed within the scope of the appended claims.

What is claimed is:

1. A method of detecting three-dimensional information, comprising the steps of: projecting a variable-intensity flying spot of light onto an object to be scanned; effecting a first scan by causing relative movement between object and light spot; receiving light-intensity signals in a single reflected light ray from the object point-by-scanned-point and modifying the intensity of the light spot in accordance with each received signal; effecting a second scan by causing relative movement between object and light spot; and reducing the light-spot intensity during the second scan at such points of the object where the signal was strong during the first scan, and increasing the light-spot intensity during the second scan at such points where the signal was weak during the first scan, said steps of effecting a first scan and a second scan comprising measurements of a multiplicity of points independent of light intensity at the object, so that accuracy of said measurements is not influenced by the light intensity at the object, the light-spot intensity during said second scan being dependent on said light-intensity signals of said first scan for preventing inaccuracy due to measurement delay and lag in modifying by a distance equal to scan velocity multiplied by measurement delay time.

2. In an arrangement for detecting three-dimensional information, a combination comprising: means for projecting a variable-intensity flying spot of light onto a object to be scanned; and means for receiving during a first scanning of the object, light-intensity signals in a single reflected light ray back from the object, point-by-scanned-point and for modifying the intensity of the projected light spot in accordance with each such signal received, for reducing, during the subsequent second scan, the light-spot intensity at such points of the object where the signal was strong during the first scan, and for increasing the light-spot intensity during the second scan at such points of the object where the signal was weak during the first scan, said first scan and second scan comprising measurements of a multiplicity of points independent of light intensity at the object so that accuracy of said measurements is not influenced by the light intensity at the object, the light-spot intensity during said second scan being dependent on said light-intensity signals of said first scan for preventing inaccuracy due to measurement delay and lag in modifying by a distance equal to scan velocity multiplied by measurement delay time.

3. A combination as defined in claim 2, wherein said projection means comprises a variable light-intensity flying light spot projector.

4. A combination as defined in claim 2, wherein said receiving means comprises a camera.

5. A combination as defined in claim 2, wherein said reducing means comprises a control logic.

6. A combination as defined in claim 3, wherein said receiving means comprises a camera; and said reducing means comprises a control logic connected between said camera and said projector.

* * * * *